United States Patent [19]
Koike et al.

[11] Patent Number: 5,789,534
[45] Date of Patent: Aug. 4, 1998

[54] PROCESS FOR PURIFYING A FLUORINATED POLYETHER HAVING AT AN END THEREOF A TERMINAL VINYL GROUP LINKED THERETO THROUGH AN AMIDE GROUP-CONTAINING LINKAGE

[75] Inventors: Noriyuki Koike, Yoshii-machi; Shinichi Sato; Takashi Matsuda, both of Annaka, all of Japan

[73] Assignee: Shin-Etsu Chemical Co., Ltd., Tokyo, Japan

[21] Appl. No.: 693,984

[22] Filed: Aug. 8, 1996

[30] Foreign Application Priority Data

Aug. 8, 1995 [JP] Japan .................................. 7-222635

[51] Int. Cl.$^6$ ........................................ C08G 73/24
[52] U.S. Cl. .................. 528/401; 528/310; 528/315; 528/332; 528/425; 528/492; 528/503; 568/615; 568/677; 568/679
[58] Field of Search ........................ 528/401, 425, 528/480, 310, 315, 332, 492, 503; 568/615, 677, 679

[56] References Cited

PUBLICATIONS

Chem Abstract, vol. 122, 1995: 122:242059 "Fluorine containing organic silicon compounds" Takashi et al., p. 121. 122 : 267861 "Room temperature curable, acid–, alkali–, heat–, and solvent–resistant perfluoro polyether–polyamide–siloxane compositions"shinichi et al, p. 137.

Primary Examiner—Duc Truong
Attorney, Agent, or Firm—Oblon, Spivak, McClelland, Maier & Neustadt, P.C.

[57] ABSTRACT

The purification process comprises removing carboxylic acids and/or carboxylic acid salts contained as impurities in a fluorinated polyether having at at least one end thereof a terminal vinyl group linked thereto through an amide group-containing linkage by heating, in the presence of an amine compound such as triethylamine and dimethylaminotrimethylsilane, the fluorinated polyether containing said impurities or a reaction mixture obtained after the completion of reaction in a process of producing said fluorinated polyether. According to the purification process, the impurities can be easily removed from said fluorinated polyether. When the thus purified fluorinated polyether is used as a starting material for an addition type curable composition together with a SiH group-containing organosilicon compound, a liquid rubber material excellent in curability and storage stability can be obtained. Further, when the purified product is used as a starting material for hydrosilylation reaction, improvements in yield and reaction rate are expected.

8 Claims, No Drawings

PROCESS FOR PURIFYING A FLUORINATED POLYETHER HAVING AT AN END THEREOF A TERMINAL VINYL GROUP LINKED THERETO THROUGH AN AMIDE GROUP-CONTAINING LINKAGE

BACKGROUND OF THE INVENTION

1. Field of the Invention

The present invention relates to a process for removing carboxylic acids and/or carboxylic acid salts contained as impurities in a fluorinated polyether having at at least one end thereof a terminal vinyl group linked thereto through an amide group-containing linkage from said fluorinated polyether to purify the same.

2. Description of the Prior Art

A fluorinated polyether having at at least one end thereof a terminal vinyl group linked thereto through an amide group-containing linkage (sometimes, referred to simply as a fluorinated polyether having a terminal vinyl-containing amide group at an end thereof) is used as a starting material for supplying a vinyl group in an addition type curable composition (for example, Japanese Pre-examination Patent Publication (Kokai) No. 5-331372) which is a liquid rubber material for obtaining a cured rubber product by subjecting, for example, the vinyl group or groups of said fluorinated polyether as a base polymer and the SiH group or groups of a SiH group-containing organosilicon compound as a crosslinking agent to addition-curing reaction. Known processes of producing the fluorinated polyether having a terminal vinyl-containing amide group at an end thereof include a process making use of the following reaction (Japanese Pre-examination Patent Publication (Kokai) No. 60-34924 and U.S. Pat. No. 4,094,911).

$$FCOCF_2O(CF_2CF_2O)_m(CF_2O)_nCF_2COF \quad (1)$$

$$\downarrow CH_3OH$$

$$CH_3OCOCF_2O(CF_2CF_2O)_m(CF_2O)_nCF_2COOCH_3 \quad (2)$$

$$\downarrow H_2NCH_2CH=CH_2$$

$$CH_2=CHCH_2NHCOCF_2O(CF_2CF_2O)_m(CF_2O)_nCF_2CONHCH_2CH=CH_2 \quad (3)$$

The above process is an example applying one of processes of producing an amide compound from a compound containing a carboxylic acid halide group. Also, there is known a process of directly reacting the above compound (1), as a fluorinated polyether containing an acid fluoride group at an end thereof, and allylamine ($NH_2CH_2CH=CH_2$) without passing through the step of preparing the methyl ester (2). The fluorinated polyether containing an acid fluoride group at an end thereof in addition to said compound (1) includes the following compounds.

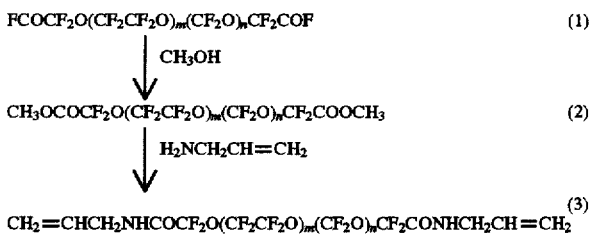

(J.Macromol.Sci.Chem., 48(3), 499–520(1974)),

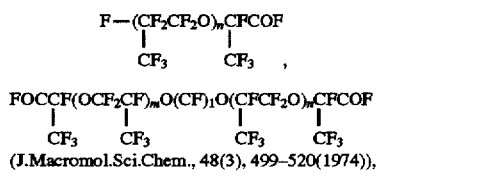

(EP 148,482)

These starting material fluorinated polyethers can be also derived directly into an intended product by reacting the starting material with a primary or secondary amine as mentioned above.

Incidentally, when the fluorinated polyether having a terminal vinyl-containing amide group at an end thereof is produced by the conventional processes as mentioned above, the acid fluoride group of the fluorinated polyether used as a starting material is liable to undergo hydrolysis. Accordingly, even if a little amount of water is mixed therein, carboxylic acids and/or carboxylic acid salts are produced by the hydrolysis and, as a result, these compounds are contained as impurities in the intended product. When the product containing these impurities is used intact as a starting material for the addition type curable composition as mentioned above, there occur the problems that the curing reaction is not carried out sufficiently and the composition gels while generating a hydrogen gas. Thus, it has been requested that these impurities were removed from the intended product for purifying the same.

However, the impurities as mentioned above can not be separated and removed by means of usual methods such as distillation since the starting material per se has inherently a high molecular weight and accordingly, the impurities are comprised of a mixture of compounds having a high molecular weight and a molecular weight distribution. If the mixing of water into the starting material can be avoided completely, of course, said problems can be solved. However, it is very difficult to really avoid the mixing of water in storing, operating or handling the starting material.

As mentioned above, the fluorinated polyether having a terminal vinyl-containing amide group at an end thereof produced by the conventional processes can not be generally avoided containing carboxylic acids and/or carboxylic acid salts as impurities and also the purification of the product is difficult by the usual methods.

SUMMARY OF THE INVENTION

Accordingly, an object of the present invention is to provide a process for purifying a fluorinated polyether having at at least one end thereof a terminal vinyl group linked thereto through an amide group-containing linkage (abbreviated to a fluorinated polyether having a terminal vinyl-containing amide group at an end thereof), said process being capable of easily removing carboxylic acids and/or carboxylic acid salts produced by the by-reaction when producing said fluorinated polyether.

The present inventors studied variously a process for removing the impurities contained in the fluorinated polyether having a terminal vinyl-containing amide group at an end thereof, said impurities being disadvantageous in the curing reaction of said addition type curable composition, and, as a result, found that upon heating said fluorinated polyether in the presence of an amine compound, carboxylic acids and carboxylic acid salts as impurities decompose and disappear, and that even if the thus purified fluorinated polyether having a terminal vinyl-containing amide group at an end thereof is used as a vinyl-supplying starting material for an addition type curable composition which is a liquid rubber material, any disadvantages do not occur in the addition-curing reaction of the purified fluorinated polyether with a SiH group-supplying starting material and further the purified fluorinated polyether is excellent in storage stability. The present invention has been completed based on the above findings.

More specifically, the purification process of the present invention is a process for purifying a fluorinated polyether having at at least one end thereof a terminal vinyl group linked thereto through an amide group-containing linkage by removing at least one impurity selected from the group consisting of carboxylic acids and carboxylic acid salts contained in said fluorinated polyether, wherein the removal of the impurity is effected by heating the fluorinated polyether containing said impurity in the presence of an amine compound.

The purification process of the present invention can be also applied intact to a reaction mixture obtained after the completion of the reaction (amidation reaction) in a process of producing a fluorinated polyether having a terminal vinyl-containing amide group at an end thereof by amidation reaction. In a different light, this case is a process for producing a fluorinated polyether having a terminal vinyl-containing amide group at an end thereof (purified product).

According to the process of the present invention, carboxylic acids and/or carboxylic acid salts contained as impurities in a fluorinated polyether having a terminal vinyl-containing amide group at an end thereof can be easily removed from said fluorinated polyether. When the thus purified polyether having a terminal vinyl-containing amide group at an end thereof is used as a starting material for an addition type curable composition together with a SiH group-containing organosilicon compound, a liquid rubber material excellent in curability and storage stability can be obtained. Further, when the purified product is used as a starting material for hydrosilylation reaction, improvements in yield and reaction rate are expected.

DETAILED DESCRIPTION OF THE PREFERRED EMBODIMENTS

Fluorinated polyether having at at least one end thereof a terminal vinyl group linked thereto through an amide group-containing linkage In the fluorinated polyether having a terminal vinyl-containing amide group at an end thereof to which the purification process of the present invention is applied, the terminal vinyl-containing amide group includes, for example, a group represented by the formula:

—CON(R$^1$)—R$^2$—CH=CH$_2$ wherein R$^1$ represents —H, —CH$_3$, —CH$_2$CH=CH$_2$ or —Ph wherein Ph stands for a phenyl group, and R$^2$ represents —CH$_2$— or —Ph'—Si(CH$_3$)$_2$— wherein Ph' stands for a phenylene group. The terminal vinyl-containing amide group may be linked to only one end or both ends of a fluorinated polyether chain.

Examples of the fluorinated polyether having a terminal vinyl-containing amide group at an end thereof include the following.

1) Examples in which a terminal vinyl-containing amide group has been linked to both ends:

CH$_2$=CHCH$_2$NHCO—R—CONHCH$_2$CH=CH$_2$,

CH$_2$=CHCH$_2$NCO—R—CONCH$_2$CH=CH$_2$,

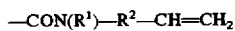

(CH$_2$=CHCH$_2$)$_2$NCO—R—CON(CH$_2$CH=CH$_2$)$_2$,

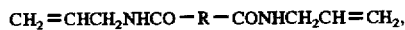

and

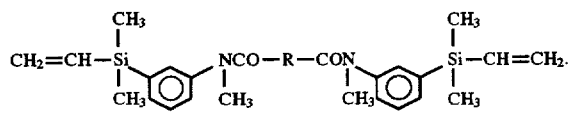

In said formulas, R is a divalent fluorinated polyether chain as mentioned below.

—CF$_2$O(C$_2$F$_4$O)$_a$(CF$_2$O)$_b$(CFCF$_2$O)$_c$CF$_2$—
                                    |
                                    CF$_3$ wherein —C$_2$F$_4$O— represents

—CF$_2$CF$_2$O— or a combination thereof, a is an integer of 0 to 200, b is an integer of 0 to 100, and c is an integer of 0 to 200, provided that a+b+c equals to an integer of 5 to 300;

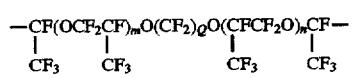

wherein Q is an integer of 2 to 8, and m and n are independently an integer of 0 to 100; and

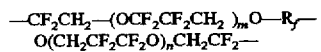

wherein Rf is a divalent perfluoroalkylene group having 2 to 8 carbon atoms, and m and n are independently an integer of 0 to 100.

2) Examples in which a terminal vinyl-containing amide group has been linked to only one end:

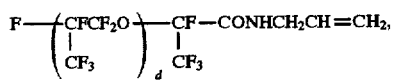

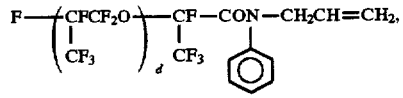

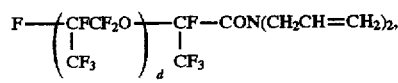

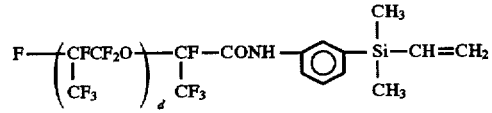

and

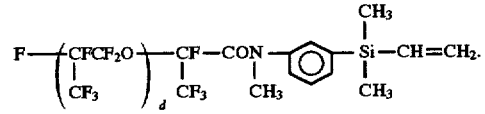

In said formulas, d is an integer of 1 to 200.

These fluorinated polyethers having a terminal vinyl-containing amide group at an end thereof contain carboxylic acids and/or carboxylic acid salts as impurities as mentioned above. These impurities are different depending upon the structure of a fluorinated polyether chain, the backbone chain of a fluorinated polyether having a terminal vinyl-containing amide group at an end. However, they include generally a carboxylic acid having a group, for example:

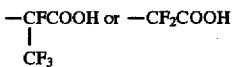

at an end thereof; and an ammonium salt, an alkali metal salt, and an alkali earth metal salt, of said carboxylic acid. Amine compound In the present invention, the amine compound is used for subjecting carboxylic acids and carboxylic acid salts contained as impurities in the fluorinated polyether having a terminal vinyl-containing amide group at an end thereof to thermal decomposition to thereby remove the carboxylic acids and carboxylic acid salts. The amine compound may be a primary, secondary or tertiary amine, and includes, for example, butylamine, diethylamine, triethylamine and an aminosilane compound such as dimethylaminotrimethylsilane, diethylaminotrimethylsilane, piperidinotrimethylsilane and bis(dimethylamino)dimethylsilane, preferably an amine compound containing a N—Si bond such as said aminosilane compound. They can be used singly or in a combination of two or more thereof.

Although the amount of the amine compound used can be widely changed depending on the amount and kind of carboxylic acids and/or carboxylic acid salts contained in a fluorinated polyether having a terminal vinyl-containing amide group at an end thereof, the amine compound is generally used in an amount of 0.1 to 10 parts by weight per 100 parts by weight of the fluorinated polyether.

Purification process

In order to practice the purification process of the present invention, basically, an amine compound is admixed with a fluorinated polyether having a terminal vinyl-containing amide group at an end and containing impurities after produced, and the resulting mixture is heated at a temperature of preferably 80° to 250° C., more preferably 120° to 160° C., with stirring. The heating time is suitably about 30 minutes to 3 hours.

In the case where the purification process of the present invention is applied to a process of producing said fluorinated polyether containing impurities as mentioned above, an amine compound is admixed intact with a reaction mixture obtained after the completion of the reaction (amidation reaction) in a process of producing the fluorinated polyether containing impurities by amidation reaction, and the resulting mixture is heated as mentioned above. More specifically, in this case, a fluorinated polyether having an acid halide group at at least one end thereof is provided as a starting material, the acid halide group of the fluorinated polyether is converted directly or indirectly to a terminal vinyl-containing amide group to produce a fluorinated polyether having a terminal vinyl-containing amide group at an end thereof and containing carboxylic acids and/or carboxylic salts as impurities, and then the fluorinated polyether containing said impurities is heated in the presence of an amine compound. In order to convert the acid halide group directly to the terminal vinyl-containing amide group, for example, a fluorinated polyether having an acid fluoride group at an end thereof and allylamine are subjected to amidation reaction in the presence of an excess triethylamine. Incidentally, in the case of this conversion method, the reaction mixture can be purified by heating the same intact. While, in order to convert the acid halide group indirectly to the terminal vinyl-containing amide group, for example, a reaction via the step of preparing methyl ester (2) is applied as described in the prior art.

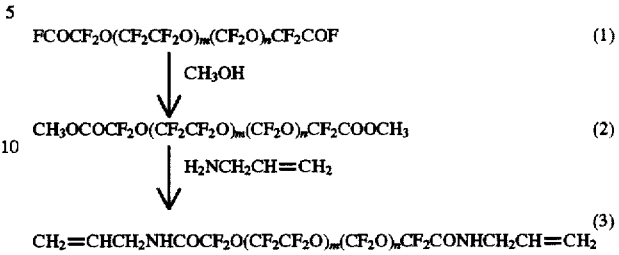

In either case of said conversion methods, it is preferred that after the amidation reaction was over, an excess amount of an aminosilane compound such as dimethylaminotrimethylsilane is further added and heated.

By the heat treatment as mentioned above, carboxylic acids and/or carboxylic acid salts which are impurities are removed from a fluorinated polyether having a terminal vinyl-containing amide group at an end thereof and containing said impurities, and after the heat treatment, an excess amine compound is separated from the treated products by a method such as stripping under a reduced pressure and then treated with an adsorbent such as active carbon.

EXAMPLES

The working examples and comparative example of the present invention will now be given in the following.

Comparative Example 1

Into a 500 mL separable flask, 200 g of a fluorinated polyether having the following formula:

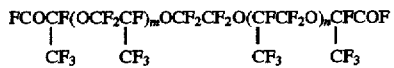

wherein m and n are each an integer such that m +n equals to 92 on average was charged, and a mixture of 4.7 g of N-allylaniline, 2.4 g of triethylamine and 13.0 g of 1,3-bis (trifluoromethyl)benzene was added dropwise thereto over 10 minutes with stirring. At this time, the temperature of the content was raised to 34° C. from 26° C. Thereafter, stirring was continued at 29° to 34° C. for 3 hours. The resulting reaction mixture was washed with diethyl ether several times, the produced salt and excess N-allylaniline were separated, and then stripping was conducted under the conditions of 70° C. and 10 mmHg. To 198 g of the resulting polymer, 2 g of active carbon, 5 g of KYOWAAD 700S (powder of aluminum silicate) and 50 g of perfluorooctane were added, stirred at 60° C. for 3 hours, filtered, and then stripped at the conditions of 100° C. and 10 mmHg to obtain 195 g of a fluorinated polyether having a vinyl-containing amido group at both ends.

Upon subjecting the polymer to IR spectrum analysis, an absorption of carboxylic acids was observed at 1795 cm$^{-1}$. The content of carboxylic acids in the polymer was quantitatively determined by the standard addition method and found to be $3.0 \times 10^{-4}$ mol/100 g.

EXAMPLE 1

Into a separable 200 ml flask, 100 g of the fluorinated polyether having a terminal vinyl-containing amide group at both ends produced in Comparative Example 1 was charged, and 0.78 g of triethylamine as an amine compound was added thereto and heat-treated at 150° C. for 2 hours on an oil bath with stirring. The treated liquid was stripped at 150° C. under 2 mmHg and cooled. Thereafter, 10 g of active carbon, 2 g of KYOWAAD 700S and 50 g of perfluorooctane were added thereto and stirred at 60° C. for 2 hours. After the resulting liquid was filtered and the active carbon was separated, stripping was conducted under the conditions of 100° C and 10 mmHg to obtain 97 g of a purified product of said fluorinated polyether. The purified fluorinated polyether was subjected to IR spectrum analysis as in Comparative Example 1, but any absorption due to the characteristics of carboxylic acids was not entirely observed.

EXAMPLE 2

Into a separable 200 ml flask, 100 g of a fluorinated polyether having the following formula:

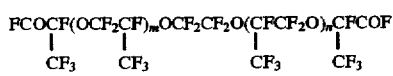

wherein m and n are each an integer such that m+n equals to 92 on average was charged, and 2.4 g of N-allylaniline, 1.2 g of triethylamine and 13.0 g of 1,3-bistrifluoromethylbenzene were added thereto and stirred at 25° to 30° C. for 3 hours. Then, to the resulting reaction mixture, 1.8 g of diethylaminotrimethylsilane as an amine compound was added and stirred at 150° C. for 2 hours, followed by stripping under the conditions of 150 ° C. and 10 mmHg. Thereto, 1 g of active carbon, 2 g of KYOWAAD 700S (powder of aluminum silicate) and 50 g of perfluorooctane were added and stirred at 60 ° C. for 2 hours. Then, the same filtration and stripping as in Example 1 were conducted to obtain 95 g of a fluorinated polyether having a vinyl-containing amido group at both ends (purified product). The fluorinated polyether was subjected to IR spectrum analysis as in Comparative Example 1, but any absorption due to the characteristics of carboxylic acids was not entirely observed.

Curing test 100.0 parts (part by weight; the same being applied hereinafter) of each of the fluorinated polyethers having a terminal vinyl-containing amide group at both ends obtained in Comparative Example 1 and Examples 1 and 2 was mixed with 0.4 part of a platinum catalyst, 0.4 part of a controlling agent, 2.1 parts of a curing agent and 10.0 parts of a filler to prepare a liquid rubber which was tested for curability, hardness and storage stability. The platinum catalyst, controlling agent, curing agent and filler used are as follows.

Platinum catalyst:

A toluene solution of a catalyst comprising a platinic acid modified with $CH_2=CHSi(CH_3)_2OSi(CH_3)_2CH=CH_2$ (1.0% by weight in terms of a concentration of platinum).

Controlling agent:

A 50% toluene solution of ethynylcyclohexanol. Curing agent (represented by an average composition of molecule):

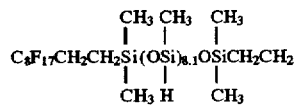

Filler:

A fumed silica, which has been treated with a trimethylsiloxy group, having a specific area of 200 m³/g.

Test methods are as follows.

Curability:

After curing a test sample at 150° C. for 1 hour, the tack feeling of the cured product is evaluated by finger touch.

Hardness:

The hardness of said cured product is measured by a spring type hardness tester type A in accordance with the method specified in JIS K 6301.

Storage stability:

A test sample is stored in the air at 40° C. for 7 days to evaluate whether gelation occurred or not.

The results of the curing test are given in Table 1.

TABLE I

|  | Comp. Example 1 | Example 1 | Example 2 |
| --- | --- | --- | --- |
| Curability (150°0 C./1 hr) | Tack-feeling | No tack-feeling | No tack-feeling |
| Hardness | 25 | 43 | 45 |
| Storage stability (40° C./7 days) | Gelation | No change | No change |

What is claimed is:

1. A process for purifying a fluorinated polyether having at at least one end thereof a terminal vinyl group linked thereto through an amide group-containing linkage by removing at least one impurity selected from the group consisting of carboxylic acids and carboxylic acid salts contained in said fluorinated polyether, which comprises effecting the removal of the impurity by heating the fluorinated polyether containing said impurity in the presence of an amine compound.

2. The process according to claim 1, wherein the amine compound is at least one compound selected from the group consisting of a primary amine, a secondary amine and a tertiary amine.

3. The process according to claim 1, wherein the amine compound is an amine compound containing a N-Si bond.

4. The process according to claim 1, wherein the heating temperature is 80° to 250° C.

5. The process according to claim 1, wherein the amine compound is present in an amount of 0.1 to 10 parts by weight per 100 parts by weight of the fluorinated polyether.

6. The process according to claim 1, wherein said fluorinated polyether is a reaction mixture obtained after completion of amidation reaction in producing said fluorinated polyether by the amidation reaction.

7. The process according to claim 1, wherein the terminal vinyl group linked thereto through an amide group-containing linkage in said fluorinated polyether is represented by the formula:

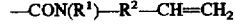

wherein $R^1$ represents —H, —$CH_3$, —$CH_2CH=CH_2$ or —Ph wherein Ph stands for a phenyl group, and $R^2$ represents —$CH_2$— or —Ph'—$Si(CH_3)_2$— wherein Ph' stands for a phenylene group.

8. The process according to claim 1, wherein said fluorinated polyether is one having at both ends thereof a terminal vinyl group linked thereto through an amide group-containing linkage.

\* \* \* \* \*